(12) United States Patent
Tu et al.

(10) Patent No.: US 9,495,973 B2
(45) Date of Patent: Nov. 15, 2016

(54) SPEECH RECOGNITION APPARATUS AND SPEECH RECOGNITION METHOD

(71) Applicant: Acer Incorporated, New Taipei (TW)

(72) Inventors: Po-Jen Tu, New Taipei (TW); Jia-Ren Chang, New Taipei (TW); Kai-Meng Tzeng, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/659,542

(22) Filed: Mar. 16, 2015

(65) Prior Publication Data

US 2016/0217808 A1   Jul. 28, 2016

(30) Foreign Application Priority Data

Jan. 26, 2015   (TW) .............................. 104102540 A

(51) Int. Cl.
| | |
|---|---|
| *G10L 21/0272* | (2013.01) |
| *G10L 25/84* | (2013.01) |
| *G10L 15/20* | (2006.01) |
| *G10L 25/87* | (2013.01) |
| *G10L 25/18* | (2013.01) |

(52) U.S. Cl.
CPC ........... *G10L 21/0272* (2013.01); *G10L 15/20* (2013.01); *G10L 25/18* (2013.01); *G10L 25/84* (2013.01); *G10L 25/87* (2013.01)

(58) Field of Classification Search
CPC ............. G10L 21/0272; G10L 21/028; G10L 21/0308
See application file for complete search history.

(56) References Cited

U.S. PATENT DOCUMENTS

| | | | | |
|---|---|---|---|---|
| 6,415,253 | B1* | 7/2002 | Johnson | G10L 21/0208 381/94.2 |
| 2003/0179888 | A1* | 9/2003 | Burnett | G10L 21/0208 381/71.8 |
| 2008/0201138 | A1* | 8/2008 | Visser | G10L 21/0208 704/227 |
| 2009/0271190 | A1* | 10/2009 | Niemisto | G10L 25/78 704/233 |
| 2010/0128894 | A1* | 5/2010 | Petit | G10L 25/93 381/92 |
| 2012/0084084 | A1* | 4/2012 | Zhu | G10L 21/0208 704/233 |
| 2012/0310641 | A1* | 12/2012 | Niemisto | G10L 25/78 704/233 |
| 2013/0132076 | A1* | 5/2013 | Yang | G10L 21/0208 704/219 |
| 2013/0151246 | A1* | 6/2013 | Jarvinen | G10L 25/93 704/214 |
| 2013/0231923 | A1* | 9/2013 | Zakarauskas | G10L 21/0208 704/205 |
| 2015/0243299 | A1* | 8/2015 | Sehlstedt | G10L 25/78 704/226 |
| 2015/0372723 | A1* | 12/2015 | Gao | H04B 7/015 704/205 |

\* cited by examiner

*Primary Examiner* — Douglas Godbold
(74) *Attorney, Agent, or Firm* — Jianq Chyun IP Office

(57) ABSTRACT

A speech recognition apparatus and a speech recognition method are provided. In the invention, whether an original voice sampling signal corresponding to a target voice frame is a noise signal is determined according to a ratio of an energy of a first consonant frequency band signal to an energy of a second consonant frequency band signal, a ratio of an energy of the first consonant frequency band signal to an energy of the original voice sampling signal and a ratio of an energy of the second consonant frequency band signal to an energy of the original voice sampling signal.

22 Claims, 5 Drawing Sheets

SPEECH RECOGNITION APPARATUS AND SPEECH RECOGNITION METHOD

CROSS-REFERENCE TO RELATED APPLICATION

This application claims the priority benefit of Taiwan application serial no. 104102540, filed on Jan. 26, 2015. The entirety of the above-mentioned patent application is hereby incorporated by reference herein and made a part of this specification.

BACKGROUND OF THE INVENTION

1. Field of the Invention

The invention relates to a recognition apparatus, and more particularly, relates to a speech recognition apparatus and a speech recognition method.

2. Description of Related Art

In general, hearing-impaired people can clearly hear voice signals with low frequency but have trouble receiving voice signals with higher frequency (e.g., a consonant signal). In conventional determination method for the consonant signal, a signal processing is performed in a frequency domain by using the determination method mainly including a non real-time determination for the consonant signal and a real-time determination for the consonant signal. The non real-time determination for the consonant signal performs the determination mainly by using an energy and a zero-cross rate. The real-time determination for the consonant signal mainly determines whether the voice signal is the consonant signal according to whether a ratio of a high frequency signal to a total energy is greater than a fixed value and whether a ratio of a low frequency signal to the total energy is less than the fixed value. Although the conventional determination method for the consonant signal is capable of distinguishing the consonant signal and a noise signal, yet an accuracy of said method still fails to meet the actual demand.

SUMMARY OF THE INVENTION

The invention is directed to a speech recognition apparatus and a speech recognition method, which are capable of effectively recognizing whether a voice signal is a consonant signal.

A speech recognition apparatus of the invention includes a band-pass filter unit and a processing unit. The band-pass filter unit performs a band-pass filtering of a first consonant frequency band and a second consonant frequency band for a voice signal in order to generate a first band-pass filter signal and a second band-pass filter signal respectively. The processing unit is coupled to the band-pass filter unit, and divides the voice signal, the first band-pass filter signal and the second band-pass filter signal into a plurality of voice frames. Herein, each of the voice frames includes an N number of sampling signals, and N is a positive integer. The processing unit further calculates an energy of the sampling signal in a target voice frame in order to obtain an energy of an original voice sampling signal, an energy of a first consonant frequency band signal and an energy of a second consonant frequency band signal, and determines whether the original voice sampling signal corresponding to the target voice frame is a noise signal according to a ratio of the energy of the first consonant frequency band signal to the energy of the second consonant frequency band signal, a ratio of the energy of the first consonant frequency band signal to the energy of the original voice sampling signal and a ratio of the energy of the second consonant frequency band signal to the energy of the original voice sampling signal.

In an embodiment of the invention, the processing unit determines whether the ratio of the energy of the first consonant frequency band signal to the energy of the second consonant frequency band signal, the ratio of the energy of the first consonant frequency band signal to the energy of the original voice sampling signal and the ratio of the energy of the second consonant frequency band signal to the energy of the original voice sampling signal fall within corresponding preset ratio ranges respectively. If the ratio of the energy of the first consonant frequency band signal to the energy of the second consonant frequency band signal, the ratio of the energy of the first consonant frequency band signal to the energy of the original voice sampling signal and the ratio of the energy of the second consonant frequency band signal to the energy of the original voice sampling signal fall within the corresponding preset ratio ranges respectively, the original voice sampling signal of a target voice frame is the noise signal.

In an embodiment of the invention, the processing unit further calculates a weighted average of the energies of the voice frames having the original voice sampling signals previously determined as the noise signal in order to obtain a noise signal energy weighted average, and determines whether the original voice sampling signal corresponding to the target voice frame is a consonant signal according to whether the energy of the original voice sampling signal corresponding to the target voice frame is greater than the noise signal energy weighted average.

In an embodiment of the invention, a weighted value corresponding to each of the voice frames having the original voice sampling signals determined as the noise signal changes with different lengths of an interval from each of the voice frames having the original voice sampling signals determined as the noise signal to the target voice frame.

In an embodiment of the invention, the processing unit further determines whether the original voice sampling signal corresponding to the target voice frame is the consonant signal according to whether a sum of the ratio of the energy of the second consonant frequency band signal to the energy of the original voice sampling signal and the ratio of the energy of the first consonant frequency band signal to the energy of the original voice sampling signal is greater than or equal to a preset sum value.

In an embodiment of the invention, the processing unit further calculates a weighted average of ratios of the energies of the first consonant frequency band signals to the energies of the original voice sampling signals corresponding to the voice frames having the original voice sampling signals previously determined as the noise signal in order to obtain a first consonant energy ratio weighted average, and determines whether the original voice sampling signal corresponding to the target voice frame is the consonant signal according to whether the ratio of the energy of the first consonant frequency band signal to the energy of the original voice sampling signal corresponding to the target voice frame is less than the first consonant energy ratio weighted average.

In an embodiment of the invention, a weighted value of each of the ratios of the energies of the first consonant frequency band signals to the energies of the original voice sampling signals corresponding to the voice frames having the original voice sampling signals determined as the noise signal changes with different lengths of an interval from each of the voice frames having the original voice sampling signals determined as the noise signal to the target voice frame.

In an embodiment of the invention, the processing unit further determines whether the original voice sampling signal corresponding to the target voice frame is the consonant signal according to whether the ratio of the energy of the second consonant frequency band signal to the energy of the original voice sampling signal is greater than or equal to a preset ratio.

In an embodiment of the invention, the processing unit further determines whether the original voice sampling signal corresponding to the target voice frame is the consonant signal according to whether the energy of the original voice sampling signal is greater than or equal to a lower limit value.

In an embodiment of the invention, the processing unit further calculates a first zero-cross rate, a second zero-cross rate and a third zero-cross rate of the original voice sampling signal and calculates an average zero-cross rate of the original voice sampling signals in the target voice frame and a plurality of the voice frames in front of the target voice frame in order to obtain a first average zero-cross rate, a second average zero-cross rate and a third average zero-cross rate, and determines whether the original voice sampling signal corresponding to the target voice frame is the consonant signal according to whether the first average zero-cross rate, the second zero-cross rate and the third zero-cross rate are greater than or equal to corresponding preset average zero-cross rates respectively. The first zero-cross rate, the second zero-cross rate and the third zero-cross rate are frequencies of the original voice sampling signal in the target voice frame for crossing a first preset value, a second preset value and a third preset value respectively, and the second preset value is less than the first preset value and greater than the third preset value.

In an embodiment of the invention, the processing unit further determines whether the original voice sampling signal corresponding to the target voice frame is the consonant signal according to whether the second zero-cross rate is greater than or equal to a preset zero-cross rate.

A speech recognition method of the invention includes the following steps. A band-pass filtering of a first consonant frequency band and a second consonant frequency band is performed for a voice signal in order to generate a first band-pass filter signal and a second band-pass filter signal respectively. The voice signal, the first band-pass filter signal and the second band-pass filter signal are divided into a plurality of voice frames. Herein, each of the voice frames includes an N number of sampling signals, and N is a positive integer. Energies of the sampling signals in a target voice frame are calculated in order to obtain an energy of an original voice sampling signal, an energy of a first consonant frequency band signal and an energy of a second consonant frequency band signal. Whether the original voice sampling signal corresponding to the target voice frame is a noise signal is determined according to a ratio of the energy of the first consonant frequency band signal to the energy of the second consonant frequency band signal, a ratio of the energy of the first consonant frequency band signal to the energy of the original voice sampling signal and a ratio of the energy of the second consonant frequency band signal to the energy of the original voice sampling signal.

In an embodiment of the invention, said speech recognition method further includes the following steps. Whether the ratio of the energy of the first consonant frequency band signal to the energy of the second consonant frequency band signal, the ratio of the energy of the first consonant frequency band signal to the energy of the original voice sampling signal and the ratio of the energy of the second consonant frequency band signal to the energy of the original voice sampling signal fall within corresponding preset ratio ranges respectively is determined. If the ratio of the energy of the first consonant frequency band signal to the energy of the second consonant frequency band signal, the ratio of the energy of the first consonant frequency band signal to the energy of the original voice sampling signal and the ratio of the energy of the second consonant frequency band signal to the energy of the original voice sampling signal fall within the corresponding preset ratio ranges respectively, the original voice sampling signal of a target voice frame is the noise signal.

In an embodiment of the invention, said speech recognition method further includes the following steps. A weighted average of the energies of the voice frames having the original voice sampling signals previously determined as the noise signal is calculated in order to obtain a noise signal energy weighted average. Whether the original voice sampling signal corresponding to the target voice frame is a consonant signal is determined according to whether the energy of the original voice sampling signal corresponding to the target voice frame is greater than the noise signal energy weighted average.

In an embodiment of the invention, a weighted value corresponding to each of the voice frames having the original voice sampling signals determined as the noise signal changes with different lengths of an interval from each of the voice frames having the original voice sampling signals determined as the noise signal to the target voice frame.

In an embodiment of the invention, said speech recognition method further includes: determining whether the original voice sampling signal corresponding to the target voice frame is the consonant signal according to whether a sum of the ratio of the energy of the second consonant frequency band signal to the energy of the original voice sampling signal and the ratio of the energy of the first consonant frequency band signal to the energy of the original voice sampling signal is greater than or equal to a preset sum value.

In an embodiment of the invention, said speech recognition method further includes the following steps. A weighted average of ratios of the energies of the first consonant frequency band signals to the energies of the original voice sampling signals corresponding to the voice frames having the original voice sampling signals previously determined as the noise signal is calculated in order to obtain a first consonant energy ratio weighted average. Whether the original voice sampling signal corresponding to the target voice frame is the consonant signal is determined according to whether the ratio of the energy of the first consonant frequency band signal to the energy of the original voice sampling signal corresponding to the target voice frame is less than the first consonant energy ratio weighted average.

In an embodiment of the invention, a weighted value of each of the ratios of the energies of the first consonant frequency band signals to the energies of the original voice sampling signals corresponding to the voice frames having the original voice sampling signals determined as the noise signal changes with different lengths of an interval from each of the voice frames having the original voice sampling signals determined as the noise signal to the target voice frame.

In an embodiment of the invention, said speech recognition method further includes: determining whether the original voice sampling signal corresponding to the target voice frame is the consonant signal according to whether the ratio of the energy of the second consonant frequency band signal to the energy of the original voice sampling signal is greater than or equal to a preset ratio.

In an embodiment of the invention, said speech recognition method further includes: determining whether the original voice sampling signal corresponding to the target voice frame is the consonant signal according to whether the energy of the original voice sampling signal is greater than or equal to a lower limit value.

In an embodiment of the invention, said speech recognition method further includes the following steps. A first zero-cross rate, a second zero-cross rate and a third zero-cross rate of the original voice sampling signal are calculated and an average zero-cross rate of the original voice sampling signals in the target voice frame and a N number of the voice frames in front of the target voice frame is calculated in order to obtain a first average zero-cross rate, a second average zero-cross rate and a third average zero-cross rate. Herein, N is a positive integer. The first zero-cross rate, the second zero-cross rate and the third zero-cross rate are frequencies of the original voice sampling signal in the target voice frame for crossing a first preset value, a second preset value and a third preset value respectively, and the second preset value is less than the first preset value and greater than the third preset value. Whether the original voice sampling signal corresponding to the target voice frame is the consonant signal is determined according to whether the first average zero-cross rate, the second zero-cross rate and the third zero-cross rate are greater than or equal to corresponding preset average zero-cross rates respectively.

In an embodiment of the invention, said speech recognition method further includes: determining whether the original voice sampling signal corresponding to the target voice frame is the consonant signal according to whether the second zero-cross rate is greater than or equal to a preset zero-cross rate.

Based on the above, in the embodiments of the invention, whether the original voice sampling signal corresponding to the target voice frame is the noise signal is determined according to the ratio of the energy of the first consonant frequency band signal to the energy of the second consonant frequency band signal, the ratio of the energy of the first consonant frequency band signal to the energy of the original voice sampling signal and the ratio of the energy of the second consonant frequency band signal to the energy of the original voice sampling signal. As a result, occurrences of the situation where the original voice sampling signal is mistakenly determined as the consonant signal may be reduced to improve the recognition accuracy for the consonant signal.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
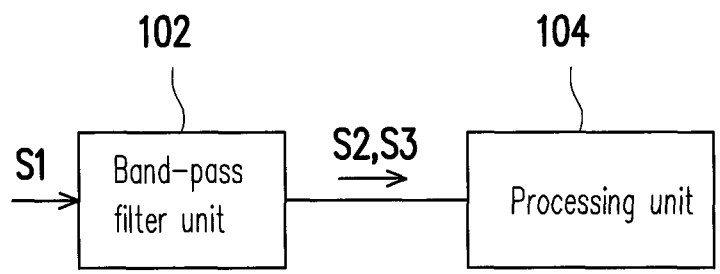
FIG. 1 is a schematic view illustrating a speech recognition apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, FIG. 1 is a schematic view illustrating a speech recognition apparatus according to an embodiment of the invention. The speech recognition apparatus includes a band-pass filter unit 102 and a processing unit 104, and the band-pass filter unit 102 is coupled to the processing unit 104. The band-pass filter unit 102 may be implemented by a band-pass filter, for example; the processing unit 104 may be implemented by a central processing unit, for example, but the invention is not limited to the above. The band-pass filter unit 102 may perform a band-pass filtering of a first consonant frequency band and a second consonant frequency band for a voice signal S1 in order to generate a first band-pass filter signal S2 and a second band-pass filter signal S3 respectively. In the present embodiment, the first consonant frequency band and the second consonant frequency band are 2 kHz to 4 kHz and 4 kHz to 10 kHz respectively, but the invention is not limited thereto.

The processing unit 104 may sample the voice signal S1, the first band-pass filter signal S2 and the second band-pass filter signal S3, and divide the voice signal S1, the first band-pass filter signal S2 and the second band-pass filter signal S3 into a plurality of voice frames. Herein, each of the voice frames may include an N number of sampling signals of the voice signal S1, an N number of sampling signals of the first band-pass filter signal S2 and an N number of sampling signals of the second band-pass filter signal S3. The processing unit 104 may further calculate an energy of the sampling signal in each of the voice frames in order to obtain an energy of an original voice sampling signal, an energy of a first consonant frequency band signal and an energy of a second consonant frequency band signal. Herein, the energy of the original voice sampling signal, the energy of the first consonant frequency band signal and the energy of the second consonant frequency band signal are corresponding to the energies of the sampling signals of the voice signal S1, the sampling signals of the first band-pass filter signal S2 and the sampling signals of the second band-pass filter signal S3 in the voice frames respectively. After obtaining the energy of the original voice sampling signal, the energy of the first consonant frequency band signal and the energy of the second consonant frequency band signal, the processing unit 104 may determine whether the original voice sampling signal corresponding to each of the voice frames is a noise signal according to a ratio of the energy of the first consonant frequency band signal to the energy of the second consonant frequency band signal, a ratio of the energy of the first consonant frequency band signal to the energy of the original voice sampling signal and a ratio of the energy of the second consonant frequency band signal to the energy of the original voice sampling signal.

Specifically, the processing unit 104 may determine whether the ratio of the energy of the first consonant frequency band signal to the energy of the second consonant frequency band signal, the ratio of the energy of the first consonant frequency band signal to the energy of the original voice sampling signal and the ratio of the energy of the second consonant frequency band signal to the energy of the original voice sampling signal fall within corresponding preset ratio ranges respectively. If the ratio of the energy of the first consonant frequency band signal to the energy of the second consonant frequency band signal, the ratio of the energy of the first consonant frequency band signal to the energy of the original voice sampling signal and the ratio of the energy of the second consonant frequency band signal to the energy of the original voice sampling signal fall within the corresponding preset ratio ranges respectively, the original voice sampling signal of a target voice frame is the noise signal.

For instance, a method for the processing unit 104 to determine whether the original voice sampling signal corresponding to the target voice frame (e.g., a $m^{th}$ voice frame, where m is a positive integer) is the noise signal may include use of the following formulas:

$$0.7 < \frac{EB1_m}{EB2_m} < 1.3 \quad (1)$$

$$0.25 < \frac{EB2_m}{E_m} < 0.5 \quad (2)$$

$$0.25 < \frac{EB1_m}{E_m} < 0.5 \quad (3)$$

Herein, $EB1_m$ is the energy of the first consonant frequency band signal, $EB2_m$ is the energy of the second consonant frequency band signal and $E_m$ is the energy of the original voice sampling signal. When formulas (1), (2) and (3) are all satisfied, the processing unit 104 may determine that the original voice sampling signal of the $m^{th}$ voice frame is the noise signal.

After determining the original voice sampling signal of the target voice frame as the noise signal, the processing unit 104 further calculates a weighted average of the energies of the voice frames having the original voice sampling signals previously determined as the noise signal in front of the target voice frame in order to obtain a noise signal energy weighted average, and determines whether the original voice sampling signal corresponding to the target voice frame is a consonant signal according to whether the energy of the original voice sampling signal corresponding to the target voice frame is greater than the noise signal energy weighted average.

For instance, the noise signal energy weighted average may be obtained by calculating the weighted average of the energies of three voice frames having the original voice sampling signals previously determined as the noise signal in front of the target voice frame. Assuming that the three voice frames recently determined as the noise signal in front of the $m^{th}$ voice frame are a $(m-10)^{th}$ voice frame, a $(m-12)^{th}$ voice frame and a $(m-20)^{th}$ voice frame, respectively, the noise signal energy weighted average $AK_m$ corresponding to the $m^{th}$ voice frame may be represented by the following formula:

$$AK_m = \frac{a0 \times E_{m-10} + a1 \times E_{m-12} + a2 \times E_{m-20}}{a0 + a1 + a2} \quad (4)$$

Herein, $E_{m-10}$, $E_{m-12}$ and $E_{m-20}$ are the energies of the original voice sampling signals of the $(m-10)^{th}$ voice frame, the $(m-12)^{th}$ voice frame and the $(m-20)^{th}$ voice frame respectively; and a0, a1 and a2 are weight values corresponding to the $(m-10)^{th}$ voice frame, the $(m-12)^{th}$ voice frame and the $(m-20)^{th}$ voice frame respectively. The weight values a0, a1 and a2 may be fixed values or variable values. For instance, a weighted value corresponding to each of the voice frames having the original voice sampling signals determined as the noise signal may change with different lengths of an interval from each of the voice frames having the original voice sampling signals determined as the noise signal to the target voice frame. For example, in the present embodiment, the weighted values a0, a1 and a2 may change with the different lengths of the interval from each of the voice frames to the $m^{th}$ voice frame. The original voice sampling signal corresponding to the $m^{th}$ voice frame may be determined as the consonant signal when the noise signal energy weighted average $AK_m$ satisfies the following formula:

$$E_m > AK_m \quad (5)$$

In addition, the processing unit may calculate a weighted average of ratios of the energies of the first consonant frequency band signals to the energies of the original voice sampling signals corresponding to the voice frames having the original voice sampling signals previously determined as the noise signal in order to obtain a first consonant energy ratio weighted average, and determine whether the original voice sampling signal corresponding to the target voice frame is the consonant signal according to whether the ratio of the energy of the first consonant frequency band signal to the energy of the original voice sampling signal corresponding to the target voice frame is less than the first consonant energy ratio weighted average. For instance, the first consonant energy ratio weighted average may be obtained by calculating the weighted average of the ratios of the energies of the first consonant frequency band signals to the energies of the original voice sampling signals corresponding to three voice frames having the original voice sampling signals previously determined as the noise signal in front of the target voice frame. Assuming that the three voice frames recently determined as the noise signal in front of the $m^{th}$ voice frame are a $(m-10)^{th}$ voice frame, a $(m-12)^{th}$ voice frame and a $(m-20)^{th}$ voice frame, the first consonant energy ratio weighted average $AF_m$ corresponding to the $m^{th}$ voice frame may be represented by the following formula:

$$AK_m = \frac{c0 \times \frac{EB1_{m-10}}{E_{m-10}} + c1 \times \frac{EB1_{m-12}}{E_{m-12}} + c2 \times \frac{EB1_{m-20}}{E_{m-20}}}{c0 + c1 + c2} \quad (6)$$

Herein, $EB1_{m-10}$, $EB1_{m-12}$ and $EB1_{m-20}$ are the energies of the first consonant frequency band signals of the $(m-10)^{th}$ voice frame, the $(m-12)^{th}$ voice frame and the $(m-20)^{th}$ voice frame respectively; $E_{m-10}$ $E_{m-12}$ and $E_{m-20}$ are the energies of the original voice sampling signals of the $(m-10)^{th}$ voice frame, the $(m-12)^{th}$ voice frame and the $(m-20)^{th}$ voice frame respectively; and c0, c1 and c2 are weight values corresponding to the $(m-10)^{th}$ voice frame, the $(m-12)^{th}$ voice frame and the $(m-20)^{th}$ voice frame respectively. The weight values c0, c1 and c2 may be fixed values or variable values. For instance, a weighted value of each of the ratios of the energies of the first consonant frequency band signals to the energies of the original voice sampling signals corresponding to the voice frames having the original voice sampling signals determined as the noise signal may change with different lengths of an interval from each of the voice frames having the original voice sampling signals determined as the noise signal to the target voice frame. For example, in the present embodiment, the weighted values c0, c1 and c2 may change with the different lengths of the interval from each of the voice frames to the $m^{th}$ voice frame. The original voice sampling signal corresponding to the $m^{th}$ voice frame may be determined as the consonant signal when the first consonant energy ratio weighted average $AF_m$ satisfies the following formula:

$$\frac{EB1_m}{E_m} < AF_m \qquad (7)$$

In addition, the processing unit 104 may determine whether the original voice sampling signal corresponding to the target voice frame is the consonant signal according to whether a sum of the ratio of the energy of the second consonant frequency band signal to the energy of the original voice sampling signal and the ratio of the energy of the first consonant frequency band signal to the energy of the original voice sampling signal is greater than or equal to a preset sum value. For example, in regard to the $m^{th}$ voice frame, aforesaid determination method may be represented by the following formula:

$$\frac{EB1_m}{E_m} + \frac{EB2_m}{E_m} \geq 1 \qquad (8)$$

In the present embodiment, the preset sum value is 1, but the invention is not limited thereto. The preset sum value may also be adjusted to be other values based on actual situations.

Further, the processing unit 104 may also determine whether the original voice sampling signal corresponding to the target voice frame is the consonant signal according to whether the ratio of the energy of the second consonant frequency band signal to the energy of the original voice sampling signal is greater than or equal to a preset ratio. For example, in regard to the $m^{th}$ voice frame, aforesaid determination method may be represented by the following formula:

$$\frac{EB2_m}{E_m} \geq 0.8 \qquad (9)$$

In the present embodiment, the preset ratio is 0.8, but the invention is not limited thereto. In some other embodiments, the preset ratio may also be other values, such as:

$$\frac{EB2_m}{E_m} \geq 0.35 \qquad (10)$$

In formula (10), the preset ratio is 0.35.

In addition, the processing unit 104 may also determine whether the original voice sampling signal corresponding to the target voice frame is the consonant signal according to whether the energy of the original voice sampling signal is greater than or equal to a lower limit value. For example, in regard to the $m^{th}$ voice frame, aforesaid determination method may be represented by the following formula:

$$E_m \geq 50 \qquad (11)$$

In the present embodiment, the lower limit value is 50, but the invention is not limited thereto. In some other embodiments, the lower limit value may also be adjusted based on actual situations.

Because a situation may arise where the consonant signal may have different sizes of energy, the portion of the signal with less energy may be deemed as the noise signal. To avoid such situation, other than determining whether the original voice sampling signal is the consonant signal according to the energies, the processing unit 104 may also determine whether the original voice sampling signal is the consonant signal according to zero-cross rates. The processing unit 104 may calculate a first zero-cross rate, a second zero-cross rate and a third zero-cross rate of the original voice sampling signal and calculate an average zero-cross rate of the original voice sampling signals in the target voice frame and a plurality of the voice frames in front of the target voice frame in order to obtain a first average zero-cross rate, a second average zero-cross rate and a third average zero-cross rate, and determine whether the original voice sampling signal corresponding to the target voice frame is the consonant signal according to whether the first average zero-cross rate, the second zero-cross rate and the third zero-cross rate are greater than or equal to corresponding preset average zero-cross rates respectively. Herein, the first zero-cross rate, the second zero-cross rate and the third zero-cross rate are frequencies of the original voice sampling signal in the target voice frame for crossing a first preset value, a second preset value and a third preset value respectively, and the second preset value is less than the first preset value and greater than the third preset value.

In regard to the $m^{th}$ voice frame, an original zero-cross rate $Z_m^0$ may be represented by the following formula:

$$Z_m^0 = \sum_{j=1}^{N-1} 0.5\{\operatorname{sgn}[\hat{x}_m(mL+j)] - \operatorname{sgn}[\hat{x}_m(mL+j-1)]\} \qquad (12)$$

Herein, N is a positive integer which denotes a number of the sampling signals within the $m^{th}$ voice frame, mL is a margin threshold, and $\hat{x}_m$ is the original voice sampling signal within the $m^{th}$ voice frame. The processing unit 104 may determine whether the original voice sampling signal is the consonant signal according to whether $Z_m^0$ is greater than or equal to a preset zero-cross rate by, for example, the following formula:

$$Z_m^0 \geq 22 \qquad (13)$$

Herein, the preset zero-cross rate is not limited only to be 22, and its value may also be adjusted based on actual situations in some other embodiments. In addition, the processing unit 104 may also determine whether the original voice sampling signal is the consonant signal according to zero-cross rates $Z_m^+$ and $Z_m^-$ of an energy condition contained in the original voice sampling signal, and the zero-cross rates $Z_m+$ and $Z_m^-$ may be respectively represented by the following formulas:

$$Z_m^+ = \sum_{j=1}^{N-1} 0.5\{\operatorname{sgn}[x_m^+(mL+j)] - \operatorname{sgn}[x_m^+(mL+j-1)]\} \qquad (14)$$

-continued $$Z_m^- = \sum_{j=1}^{N-1} 0.5\{\text{sgn}[x_m^-(mL+j)] - \text{sgn}[x_m^-(mL+j-1)]\} \quad (15)$$

Herein, $x_m^+$ and $x_m^-$ may be respectively represented by the following formulas:

$$x_m^+(j) = \hat{x}_m(j+mL) - \alpha_x E_m \quad (16)$$

$$x_m^-(j) = \hat{x}_m(j+mL) + \alpha_x E_m \quad (17)$$

In the present embodiment, a value of $\alpha_x$ is 0.5, but the invention is not limited thereto. In some other embodiments, said value may also be adjusted based on actual situations. Accordingly, by adjusting a criterion for calculating the zero-cross rate, whether the original voice sampling signal is the consonant signal may be determined more accurately. The processing unit 104 may also determine whether the original voice sampling signal is the consonant signal according to the average zero-cross rate of the voice frames. For instance, in regard to the $m^{th}$ voice frame, whether the original voice sampling signal is the consonant signal may be determined according to an average of zero-cross rates of the closest two voice frames (i.e., $(m-1)^{th}$ and $(m-2)^{th}$ voice frames), and a determination method may be represented as follows.

$$\frac{Z_m^0 + Z_{m-1}^0 + Z_{m-2}^0}{3} \geq 34 \quad (18)$$

$$\frac{Z_m^+ + Z_{m-1}^+ + Z_{m-2}^+}{3} \geq 30 \quad (19)$$

$$\frac{Z_m^- + Z_{m-1}^- + Z_{m-2}^-}{3} \geq 30 \quad (20)$$

As described in the foregoing embodiments, the processing unit 104 may determine whether the original voice sampling signal is the consonant signal according to at least one of the energies or the zero-cross rates. That is to say, the processing unit 104 may combine use of at least one condition from among the aforementioned formulas to determine whether the original voice sampling signal is the consonant signal. For instance, the processing unit 104 may determine whether all of the formulas (5), (7), (9), (11), (13), (18), (19) and (20) are satisfied at the same time, and determines that the original voice sampling signal corresponding to the target voice frame is the consonant signal only if all of said formulas are satisfied. As another example, the processing unit 104 may also determine whether all of the formulas (5), (8), (10), (11), (13), (18), (19) and (20) are satisfied at the same time, and determines that the original voice sampling signal corresponding to the target voice frame is the consonant signal only if all of said formulas are satisfied.

Figure 2A:
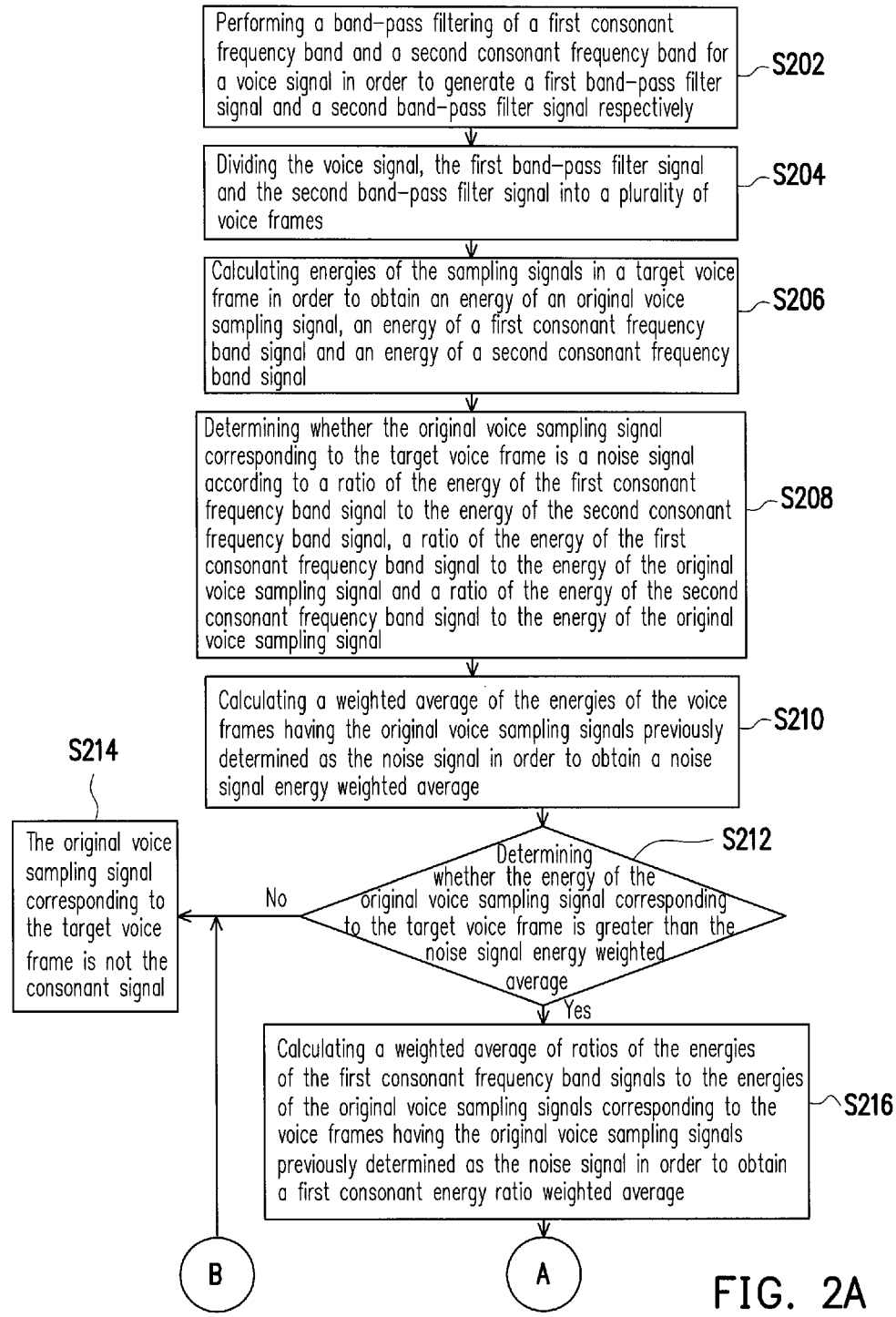
FIGS. 2A and 2B are schematic flowcharts illustrating a speech recognition method according to an embodiment of the invention.
Figure 2B:
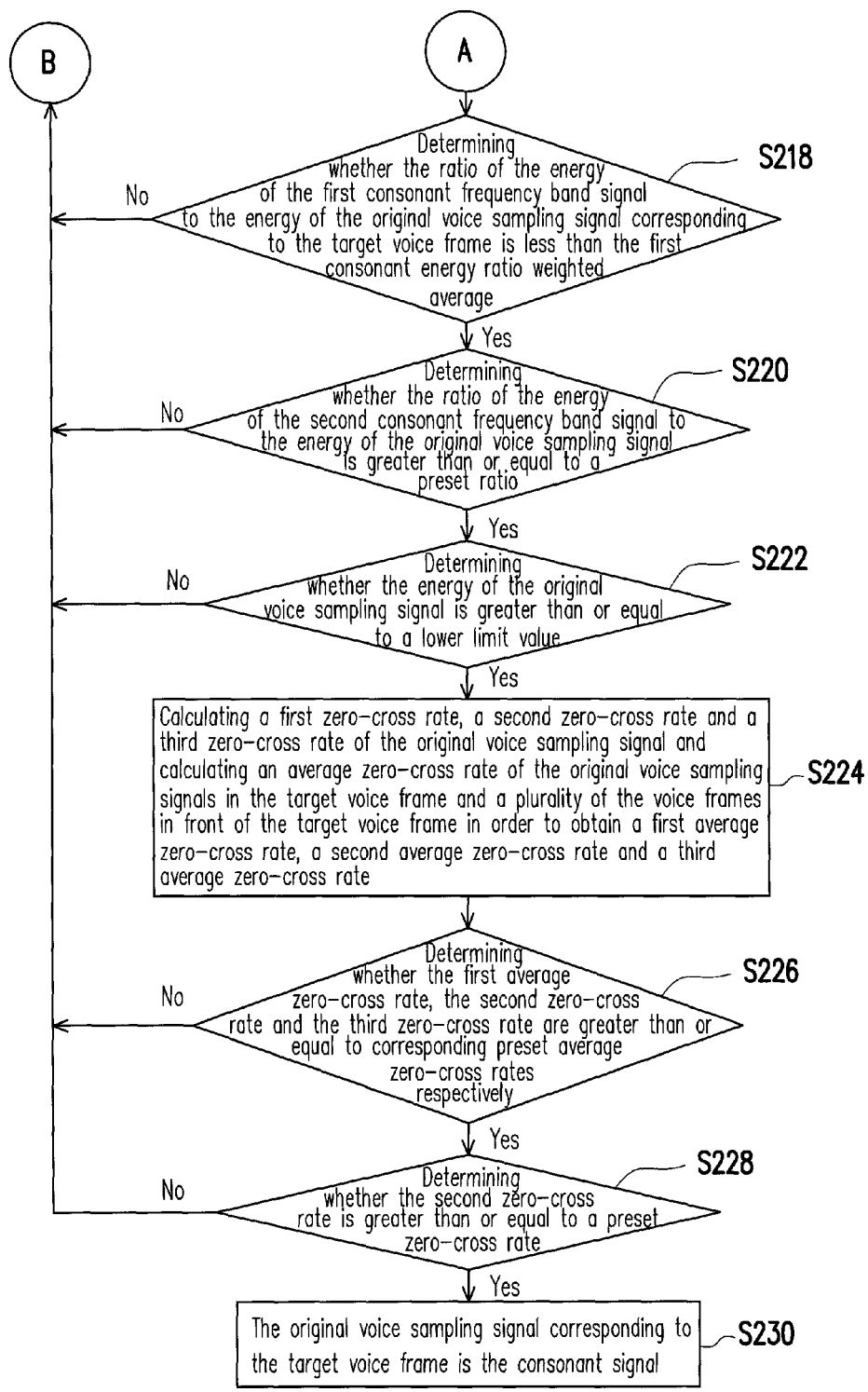

Referring to FIGS. 2A and 2B, FIGS. 2A and 2B are schematic flowcharts illustrating a speech recognition method according to an embodiment of the invention. In view of the foregoing embodiments, a speech recognition method of the speech recognition apparatus may include the following steps. First of all, a band-pass filtering of a first consonant frequency band and a second consonant frequency band is performed for a voice signal in order to generate a first band-pass filter signal and a second band-pass filter signal respectively (step S202). Subsequently, the voice signal, the first band-pass filter signal and the second band-pass filter signal are divided into a plurality of voice frames (step S204). Herein, each of the voice frames includes an N number of sampling signals, and N is a positive integer. Then, energies of the sampling signals in a target voice frame are calculated in order to obtain an energy of an original voice sampling signal, an energy of a first consonant frequency band signal and an energy of a second consonant frequency band signal (step S206). Thereafter, whether the original voice sampling signal corresponding to the target voice frame is a noise signal is determined according to a ratio of the energy of the first consonant frequency band signal to the energy of the second consonant frequency band signal, a ratio of the energy of the first consonant frequency band signal to the energy of the original voice sampling signal and a ratio of the energy of the second consonant frequency band signal to the energy of the original voice sampling signal (step S208). For example, whether the ratio of the energy of the first consonant frequency band signal to the energy of the second consonant frequency band signal, the ratio of the energy of the first consonant frequency band signal to the energy of the original voice sampling signal and the ratio of the energy of the second consonant frequency band signal to the energy of the original voice sampling signal fall within corresponding preset ratio ranges respectively may be determined. If the ratio of the energy of the first consonant frequency band signal to the energy of the second consonant frequency band signal, the ratio of the energy of the first consonant frequency band signal to the energy of the original voice sampling signal and the ratio of the energy of the second consonant frequency band signal to the energy of the original voice sampling signal fall within the corresponding preset ratio ranges respectively, the original voice sampling signal of a target voice frame is the noise signal.

Thereafter, a weighted average of the energies of the voice frames having the original voice sampling signals previously determined as the noise signal is calculated in order to obtain a noise signal energy weighted average (step S210). Thereafter, whether the energy of the original voice sampling signal corresponding to the target voice frame is greater than the noise signal energy weighted average is determined (step S212). Herein, a weighted value corresponding to each of the voice frames having the original voice sampling signals determined as the noise signal may change with different lengths of an interval from each of the voice frames having the original voice sampling signals determined as the noise signal to the target voice frame. If the energy of the original voice sampling signal corresponding to the target voice frame is not greater than the noise signal energy weighted average, it is determined that the original voice sampling signal corresponding to the target voice frame is not the consonant signal (step S214). Otherwise, if the energy of the original voice sampling signal corresponding to the target voice frame is greater than the noise signal energy weighted average, a weighted average of ratios of the energies of the first consonant frequency band signals to the energies of the original voice sampling signals corresponding to the voice frames having the original voice sampling signals previously determined as the noise signal is calculated in order to obtain a first consonant energy ratio weighted average (step S216). Then, whether the ratio of the energy of the first consonant frequency band signal to the energy of the original voice sampling signal corresponding to the target voice frame is less than the first consonant energy ratio weighted average is determined (S218). Herein, a weighted value of each of the ratios of the energies of the first consonant frequency band signals to the energies of the original voice sampling signals corresponding to the voice frames having the original voice sampling signals determined as the noise signal changes with different lengths of an interval from each of the voice frames having the original voice sampling signals determined as the noise signal to the target voice frame.

If the ratio of the energy of the first consonant frequency band signal corresponding to the target voice frame to the energy of the original voice sampling signal is not less than the first consonant energy ratio weighted average, the original voice sampling signal corresponding to the target voice frame is not the consonant signal (step S214). Otherwise, if the ratio of the energy of the first consonant frequency band signal to the energy of the original voice sampling signal corresponding to the target voice frame is less than the first consonant energy ratio weighted average, whether the ratio of the energy of the second consonant frequency band signal to the energy of the original voice sampling signal is greater than or equal to a preset ratio is then determined (step S220). If the ratio of the energy of the second consonant frequency band signal to the energy of the original voice sampling signal is not greater than or equal to the preset ratio, the original voice sampling signal corresponding to the target voice frame is not the consonant signal (step S214). Otherwise, if the ratio of the energy of the second consonant frequency band signal to the energy of the original voice sampling signal is greater than or equal to the preset ratio, whether the energy of the original voice sampling signal is greater than or equal to a lower limit value is then determined (step S222). If the energy of the original voice sampling signal is not greater than or equal to the lower limit value, the original voice sampling signal corresponding to the target voice frame is not the consonant signal (step S214).

Otherwise, if the energy of the original voice sampling signal is greater than or equal to the lower limit value, a first zero-cross rate, a second zero-cross rate and a third zero-cross rate of the original voice sampling signal are calculated and an average zero-cross rate of the original voice sampling signals in the target voice frame and a plurality of the voice frames in front of the target voice frame is calculated in order to obtain a first average zero-cross rate, a second average zero-cross rate and a third average zero-cross rate (step S224). Herein, the first zero-cross rate, the second zero-cross rate and the third zero-cross rate are frequencies of the original voice sampling signal in the target voice frame for crossing a first preset value, a second preset value and a third preset value respectively, and the second preset value is less than the first preset value and greater than the third preset value. Then, whether the first average zero-cross rate, the second zero-cross rate and the third zero-cross rate are greater than or equal to corresponding preset average zero-cross rates respectively is determined (step S226). If all of the first average zero-cross rate, the second zero-cross rate and the third zero-cross rate are not greater than or equal to the corresponding preset average zero-cross rates, the original voice sampling signal corresponding to the target voice frame is not the consonant signal (step S214). Otherwise, if the first average zero-cross rate, the second zero-cross rate and the third zero-cross rate are greater than or equal to corresponding preset average zero-cross rates respectively, whether the second zero-cross rate is greater than or equal to a preset zero-cross rate is then determined (step S228). If the second zero-cross rate is not greater than or equal to the preset zero-cross rate, the original voice sampling signal corresponding to the target voice frame is not the consonant signal (step S214). Otherwise, if the second zero-cross rate is greater than or equal to the preset zero-cross rate, the original voice sampling signal corresponding to the target voice frame is the consonant signal (step S230).

Figure 3A:
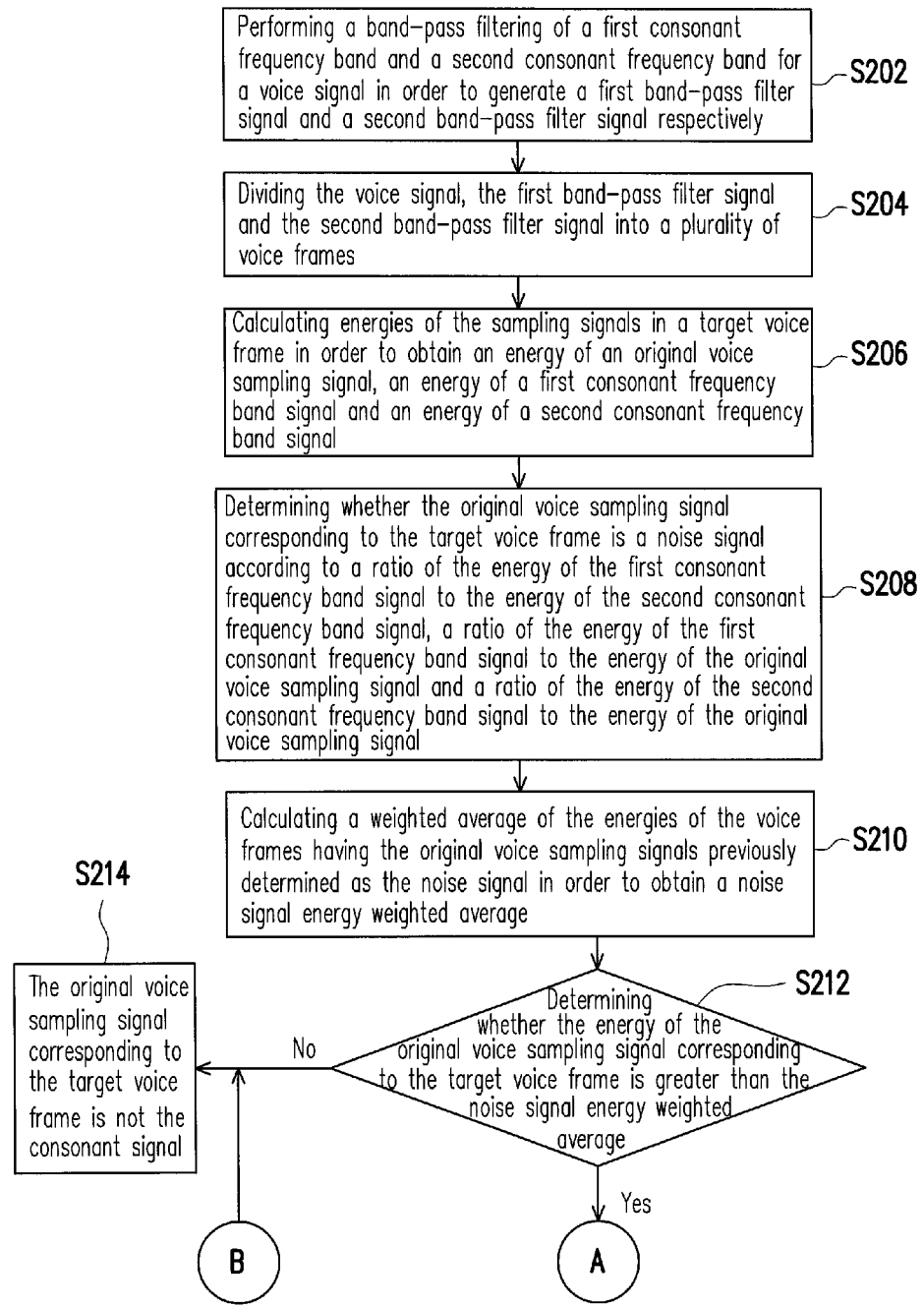
FIGS. 3A and 3B are schematic flowcharts illustrating a speech recognition method according to another embodiment of the invention.
Figure 3B:
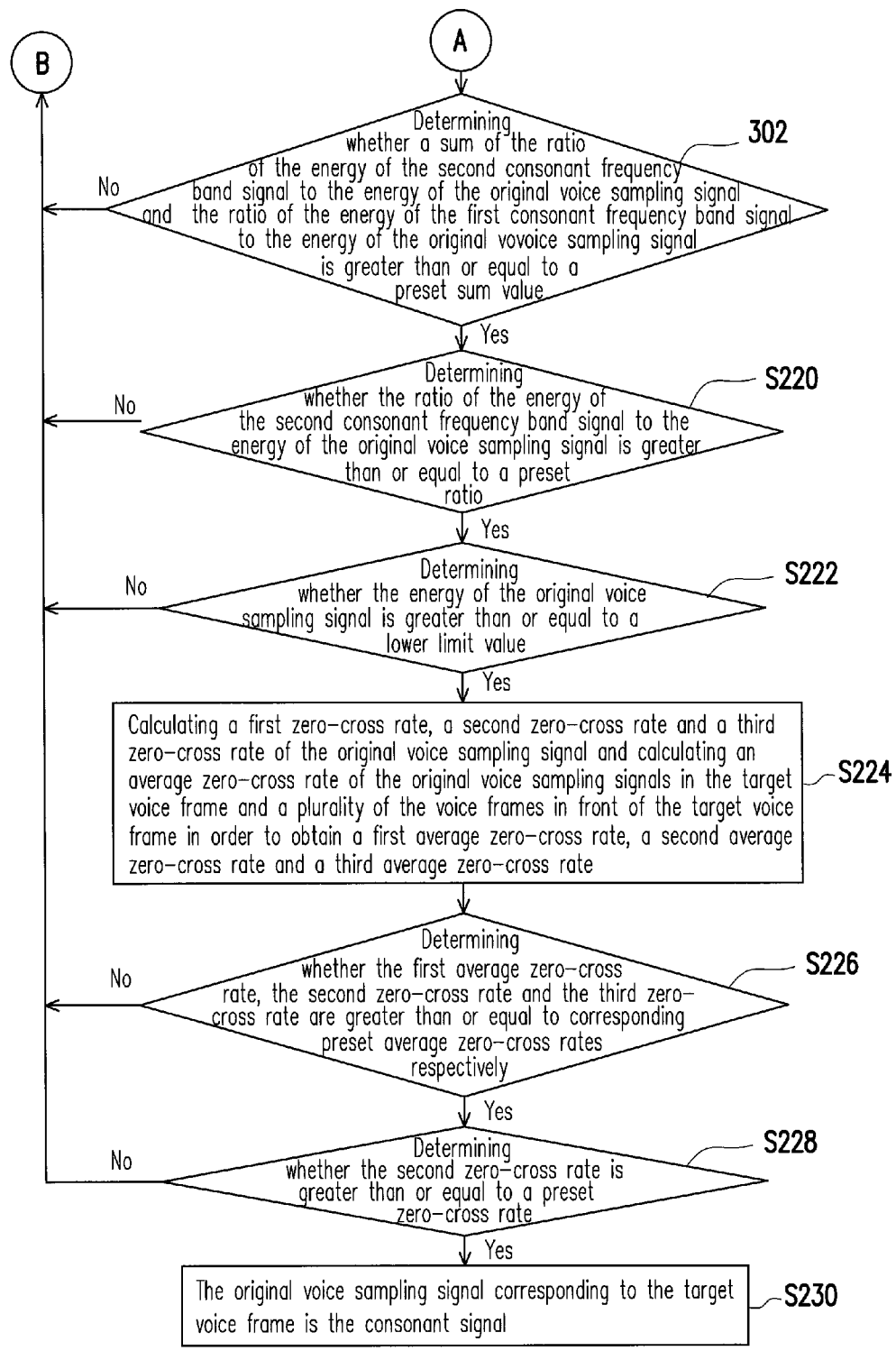

Referring to FIGS. 3A and 3B, FIGS. 3A and 3B are schematic flowcharts illustrating a speech recognition method according to an embodiment of the invention. Differences between the present embodiment and the embodiment of FIGS. 2A and 2B are described as follows. In the present embodiment, after determining that the energy of the original voice sampling signal corresponding to the target voice frame is greater than the noise signal energy weighted average in step S212, whether a sum of the ratio of the energy of the second consonant frequency band signal to the energy of the original voice sampling signal and the ratio of the energy of the first consonant frequency band signal to the energy of the original voice sampling signal is greater than or equal to a preset sum value is then determined (step S302). If the sum of the ratio of the energy of the second consonant frequency band signal to the energy of the original voice sampling signal and the ratio of the energy of the first consonant frequency band signal to the energy of the original voice sampling signal is not greater than or equal to the preset sum value, the original voice sampling signal corresponding to the target voice frame is not the consonant signal (step S214). Otherwise, if the sum of the ratio of the energy of the second consonant frequency band signal to the energy of the original voice sampling signal and the ratio of the energy of the first consonant frequency band signal to the energy of the original voice sampling signal is greater than or equal to the preset sum value, the method directly proceeds to step S220, in which whether the ratio of the energy of the second consonant frequency band signal to the energy of the original voice sampling signal is greater than or equal to the preset ratio is determined. Thereafter, the subsequent steps of the speech recognition method are executed similarly as those described in the embodiment of FIGS. 2A and 2B.

In summary, the embodiments of the invention may combine use of at least one condition from among the aforementioned formulas to determine whether the original voice sampling signal is the consonant signal, so as to improve a recognition accuracy for the consonant signal. For example, whether the original voice sampling signal corresponding to the target voice frame is the noise signal may be determined according to the ratio of the energy of the first consonant frequency band signal to the energy of the second consonant frequency band signal, the ratio of the energy of the first consonant frequency band signal to the energy of the original voice sampling signal and the ratio of the energy of the second consonant frequency band signal to the energy of the original voice sampling signal. As a result, occurrences of the situation where the original voice sampling signal is mistakenly determined as the consonant signal may be reduced to improve the recognition accuracy for the consonant signal.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A speech recognition apparatus, comprising:
 a band-pass filter, performing a band-pass filtering of a first consonant frequency band and a second consonant frequency band for a voice signal in order to generate a first band-pass filter signal and a second band-pass filter signal respectively; and a central processing unit, coupled to the band-pass filter, and dividing the voice signal, the first band-pass filter signal and the second band-pass filter signal into a plurality of voice frames, wherein each of the voice frames comprises an N number of sampling signals, N is a positive integer, the central processing unit calculates energies of the sampling signals in a target voice frame in order to obtain an energy of an original voice sampling signal, an energy of a first consonant frequency band signal and an energy of a second consonant frequency band signal, and determines whether the original voice sampling signal corresponding to the target voice frame is a noise signal according to a ratio of the energy of the first consonant frequency band signal to the energy of the second consonant frequency band signal, a ratio of the energy of the first consonant frequency band signal to the energy of the original voice sampling signal and a ratio of the energy of the second consonant frequency band signal to the energy of the original voice sampling signal.

2. The speech recognition apparatus of claim 1, wherein the central processing unit further determines whether the ratio of the energy of the first consonant frequency band signal to the energy of the second consonant frequency band signal, the ratio of the energy of the first consonant frequency band signal to the energy of the original voice sampling signal and the ratio of the energy of the second consonant frequency band signal to the energy of the original voice sampling signal fall within corresponding preset ratio ranges respectively, and if the ratio of the energy of the first consonant frequency band signal to the energy of the second consonant frequency band signal, the ratio of the energy of the first consonant frequency band signal to the energy of the original voice sampling signal and the ratio of the energy of the second consonant frequency band signal to the energy of the original voice sampling signal fall within the corresponding preset ratio ranges respectively, determines the original voice sampling signal of the target voice frame as the noise signal.

3. The speech recognition apparatus of claim 1, wherein the central processing unit further calculates a weighted average of the energies of the voice frames having the original voice sampling signals previously determined as the noise signal in order to obtain a noise signal energy weighted average, and determines whether the original voice sampling signal corresponding to the target voice frame is a consonant signal according to whether the energy of the original voice sampling signal corresponding to the target voice frame is greater than the noise signal energy weighted average.

4. The speech recognition apparatus of claim 3, wherein a weighted value corresponding to each of the voice frames having the original voice sampling signals determined as the noise signal changes with different lengths of an interval from each of the voice frames having the original voice sampling signals determined as the noise signal to the target voice frame.

5. The speech recognition apparatus of claim 3, wherein the central processing unit further determines whether the original voice sampling signal corresponding to the target voice frame is the consonant signal according to whether a sum of the ratio of the energy of the second consonant frequency band signal to the energy of the original voice sampling signal and the ratio of the energy of the first consonant frequency band signal to the energy of the original voice sampling signal is greater than or equal to a preset sum value.

6. The speech recognition apparatus of claim 5, wherein the central processing unit further calculates a weighted average of ratios of the energies of the first consonant frequency band signals to the energies of the original voice sampling signals corresponding to the voice frames having the original voice sampling signals previously determined as the noise signal in order to obtain a first consonant energy ratio weighted average, and determines whether the original voice sampling signal corresponding to the target voice frame is the consonant signal according to whether the ratio of the energy of the first consonant frequency band signal to the energy of the original voice sampling signal corresponding to the target voice frame is less than the first consonant energy ratio weighted average.

7. The speech recognition apparatus of claim 6, wherein a weighted value of each of the ratios of the energies of the first consonant frequency band signals to the energies of the original voice sampling signals corresponding to the voice frames having the original voice sampling signals determined as the noise signal changes with different lengths of an interval from each of the voice frames having the original voice sampling signals determined as the noise signal to the target voice frame.

8. The speech recognition apparatus of claim 6, wherein the central processing unit further determines whether the original voice sampling signal corresponding to the target voice frame is the consonant signal according to whether the ratio of the energy of the second consonant frequency band signal to the energy of the original voice sampling signal is greater than or equal to a preset ratio.

9. The speech recognition apparatus of claim 8, wherein the central processing unit further determines whether the original voice sampling signal corresponding to the target voice frame is the consonant signal according to whether the energy of the original voice sampling signal is greater than or equal to a lower limit value.

10. The speech recognition apparatus of claim 9, wherein the central processing unit further calculates a first zero-cross rate, a second zero-cross rate and a third zero-cross rate of the original voice sampling signal and calculates an average zero-cross rate of the original voice sampling signals in the target voice frame and a plurality of the voice frames in front of the target voice frame in order to obtain a first average zero-cross rate, a second average zero-cross rate and a third average zero-cross rate, and determines whether the original voice sampling signal corresponding to the target voice frame is the consonant signal according to whether the first average zero-cross rate, the second zero-cross rate and the third zero-cross rate are greater than or equal to corresponding preset average zero-cross rates respectively, wherein the first zero-cross rate, the second zero-cross rate and the third zero-cross rate are frequencies of the original voice sampling signal in the target voice frame for crossing a first preset value, a second preset value and a third preset value respectively, and the second preset value is less than the first preset value and greater than the third preset value.

11. The speech recognition apparatus of claim 10, wherein the central processing unit further determines whether the original voice sampling signal corresponding to the target voice frame is the consonant signal according to whether the second zero-cross rate is greater than or equal to a preset zero-cross rate.

12. A speech recognition method, comprising:

performing a band-pass filtering of a first consonant frequency band and a second consonant frequency band for a voice signal in order to generate a first band-pass filter signal and a second band-pass filter signal respectively;

dividing the voice signal, the first band-pass filter signal and the second band-pass filter signal into a plurality of voice frames, wherein each of the voice frames comprises an N number of sampling signals, and N is a positive integer;

calculating energies of the sampling signals in a target voice frame in order to obtain an energy of an original voice sampling signal, an energy of a first consonant frequency band signal and an energy of a second consonant frequency band signal; and determining whether the original voice sampling signal corresponding to the target voice frame is a noise signal according to a ratio of the energy of the first consonant frequency band signal to the energy of the second consonant frequency band signal, a ratio of the energy of the first consonant frequency band signal to the energy of the original voice sampling signal and a ratio of the energy of the second consonant frequency band signal to the energy of the original voice sampling signal.

13. The speech recognition method of claim 12, further comprising:

determining whether the ratio of the energy of the first consonant frequency band signal to the energy of the second consonant frequency band signal, the ratio of the energy of the first consonant frequency band signal to the energy of the original voice sampling signal and the ratio of the energy of the second consonant frequency band signal to the energy of the original voice sampling signal fall within corresponding preset ratio ranges respectively; and if the ratio of the energy of the first consonant frequency band signal to the energy of the second consonant frequency band signal, the ratio of the energy of the first consonant frequency band signal to the energy of the original voice sampling signal and the ratio of the energy of the second consonant frequency band signal to the energy of the original voice sampling signal fall within the corresponding preset ratio ranges respectively, determining the original voice sampling signal of the target voice frame as the noise signal.

14. The speech recognition method of claim 12, further comprising:

calculating a weighted average of the energies of the voice frames having the original voice sampling signals previously determined as the noise signal in order to obtain a noise signal energy weighted average; and determining whether the original voice sampling signal corresponding to the target voice frame is a consonant signal according to whether the energy of the original voice sampling signal corresponding to the target voice frame is greater than the noise signal energy weighted average.

15. The speech recognition method of claim 14, wherein a weighted value corresponding to each of the voice frames having the original voice sampling signals determined as the noise signal changes with different lengths of an interval from each of the voice frames having the original voice sampling signals determined as the noise signal to the target voice frame.

16. The speech recognition method of claim 14, further comprising:

determining whether the original voice sampling signal corresponding to the target voice frame is the consonant signal according to whether a sum of the ratio of the energy of the second consonant frequency band signal to the energy of the original voice sampling signal and the ratio of the energy of the first consonant frequency band signal to the energy of the original voice sampling signal is greater than or equal to a preset sum value.

17. The speech recognition method of claim 16, further comprising:

calculating a weighted average of ratios of the energies of the first consonant frequency band signals to the energies of the original voice sampling signals corresponding to the voice frames having the original voice sampling signals previously determined as the noise signal in order to obtain a first consonant energy ratio weighted average; and determining whether the original voice sampling signal corresponding to the target voice frame is the consonant signal according to whether the ratio of the energy of the first consonant frequency band signal to the energy of the original voice sampling signal corresponding to the target voice frame is less than the first consonant energy ratio weighted average.

18. The speech recognition method of claim 17, wherein a weighted value of each of the ratios of the energies of the first consonant frequency band signals to the energies of the original voice sampling signals corresponding to the voice frames having the original voice sampling signals determined as the noise signal changes with different lengths of an interval from each of the voice frames having the original voice sampling signals determined as the noise signal to the target voice frame.

19. The speech recognition method of claim 17, further comprising:

determining whether the original voice sampling signal corresponding to the target voice frame is the consonant signal according to whether the ratio of the energy of the second consonant frequency band signal to the energy of the original voice sampling signal is greater than or equal to a preset ratio.

20. The speech recognition method of claim 19, further comprising:

determining whether the original voice sampling signal corresponding to the target voice frame is the consonant signal according to whether the energy of the original voice sampling signal is greater than or equal to a lower limit value.

21. The speech recognition method of claim 20, further comprising:

calculating a first zero-cross rate, a second zero-cross rate and a third zero-cross rate of the original voice sampling signal and calculating an average zero-cross rate of the original voice sampling signals in the target voice frame and a plurality of the voice frames in front of the target voice frame in order to obtain a first average zero-cross rate, a second average zero-cross rate and a third average zero-cross rate, the first zero-cross rate, the second zero-cross rate and the third zero-cross rate are frequencies of the original voice sampling signal in the target voice frame for crossing a first preset value, a second preset value and a third preset value respectively, and the second preset value is less than the first preset value and greater than the third preset value; and determining whether the original voice sampling signal corresponding to the target voice frame is the consonant signal according to whether the first average zero-cross rate, the second zero-cross rate and the third zero-cross rate are greater than or equal to corresponding preset average zero-cross rates respectively.

22. The speech recognition method of claim 21, further comprising:

determining whether the original voice sampling signal corresponding to the target voice frame is the consonant signal according to whether the second zero-cross rate is greater than or equal to a preset zero-cross rate.

* * * * *